United States Patent [19]

Baldus et al.

[11] Patent Number: 5,340,561
[45] Date of Patent: Aug. 23, 1994

[54] PROCESS FO THE PRODUCTION OF SI₂N₄ USING A SILICON, PHOSPHOROUS AND NITROGEN CONTAINING PRECURSOR

[75] Inventors: Hans-Peter Baldus, Burscheid; Wolfgang Schnick, Bonn, both of Fed. Rep. of Germany

[73] Assignee: Bayer AG, Leverkusen, Fed. Rep. of Germany

[21] Appl. No.: 170,097

[22] Filed: Dec. 20, 1993

Related U.S. Application Data

[62] Division of Ser. No. 1,559, Jan. 6, 1993, Pat. No. 5,296,211.

[30] Foreign Application Priority Data

Jan. 15, 1992 [DE] Fed. Rep. of Germany ....... 4200787

[51] Int. Cl.⁵ .............................................. C01B 33/00
[52] U.S. Cl. .................... 423/344; 423/324; 423/406; 501/97
[58] Field of Search ................ 423/302, 318, 324, 344, 423/406, 413; 501/97

[56] References Cited

U.S. PATENT DOCUMENTS

| | | | |
|---|---|---|---|
| 4,482,689 | 11/1984 | Haluska | 528/25 |
| 4,716,028 | 12/1987 | Kasai et al. | 423/344 |
| 4,770,830 | 9/1988 | Arakawa et al. | 264/66 |
| 5,030,434 | 7/1991 | Pitzer et al. | 423/344 |
| 5,248,490 | 9/1993 | Krause | 423/344 |
| 5,258,169 | 11/1993 | Wannasat et al. | 423/344 |

FOREIGN PATENT DOCUMENTS

| | | |
|---|---|---|
| 0219764 | 4/1987 | European Pat. Off. . |
| 0251322 | 1/1988 | European Pat. Off. . |
| 0361061 | 4/1990 | European Pat. Off. . |

OTHER PUBLICATIONS

"N-(chlorophosphoranylidene)sylylamines" by L. P. Filonenko and A. M. Pinchuk translated from Zhurnal Ohshchei Khimii, vol. 49, No. 2, pp. 348–352 Feb. 1979 into English by the Plenum Publishing Corporation (1979) pp. 302–305.

"Gas Phase & Computational Studies of Pentacoordinate Silicon" by Robert Damrauer et al J.A.C.S. vol. 110, No. 20, Sep. 28, 1988, pp. 6601–6606.

Abstract (from "Orbit") of EP–A–0 219 764, Apr. 1987.

*Primary Examiner*—Gary P. Straub
*Assistant Examiner*—Timothy C. Vanoy
*Attorney, Agent, or Firm*—Connolly & Hutz

[57] ABSTRACT

The present invention relates to a process for the production of low-needle silicon nitride of high α-content, wherein an amorphous nitrogen-containing silane compound is mixed with a crystalline or amorphous compound comprising the elements silicon, phosphorus and nitrogen to form a mixture which is heat-treated at temperatures above 1000° C. to form the low-needle silicon nitride. The present invention also relates to the silicon-, nitrogen- and phosphorus-containing compound which is used as the starting material in the process for the production of the low-needle silicon nitride, and the process for the production of the silicon-, nitrogen-and phosphorus-containing compound.

17 Claims, No Drawings

PROCESS FO THE PRODUCTION OF SI$_2$N$_4$ USING A SILICON, PHOSPHOROUS AND NITROGEN CONTAINING PRECURSOR

This application is a divisional application of application Ser. No. 08-001,559 filed Jan. 6, 1993, now U.S. Pat. No. 5,296,211.

BACKGROUND OF THE INVENTION

This invention relates to a process for the production of low-needle silicon nitride of high α-content, to a silicon-, nitrogen- and phosphorus-containing compound as starting material and to a process for the production of this compound.

Crystalline silicon nitride powder for engineering ceramic applications is generally obtained by thermal decomposition of silicon diimide or by crystallization of amorphous silicon nitride at approx. 1450° C. The calcination product generally contains more than 80% α-silicon nitride. The rest consists of β-silicon nitride and amorphous fractions, depending on the halogen and oxygen content of the starting materials and on the temperature.

Silicon nitride powder produced in this way generally has a high percentage content of large (>2 μm) acicular or columnar crystals which largely consist of the β-phase. This is a disadvantage when the powder is used for the production of sintered compacts because a low green density is obtained with a high percentage content of acicular crystals, resulting in a low density of the sintered workpiece. Accordingly, sintered compacts of the type in question show poor strength and fracture toughness values on account of their high residual porosity.

Accordingly, Si$_3$N$_4$ powder used for engineering ceramics should have an α-content of at least 90% with very few, if any, needles, Spherical particles less than 1 μm in size are the most favorable.

U.S. Pat. No. 4,770,830 describes a process for the production of needle-free Si$_3$N$_4$ having an α-content of >90%. In this process, a small quantity of crystalline silicon nitride (approx. 5%) is added to the amorphous starting product. The crystalline powder added must have an α-content of greater than 90% and a high percentage content of particularly fine powder. The percentage contribution of the particles smaller than 0.05 μm in size to the total weight of additive and product to be calcined must amount to at least 0.1% by weight. In addition, the heating rate between 1200° and 1350° C. should be at least 15° C./minute.

The α-contents and particle sizes obtainable by this process are described as satisfactory. However, the addition of α-Si$_3$N$_4$ crystallization nuclei does not reduce the intragranular oxygen or halogen content of the starting powder. This is because powders produced by the diimide process still contain percentage of intragranular oxygen which promotes needle formation and hence has an adverse effect on the sintering properties.

By contrast, Si$_3$N$_4$ powders produced by a gas-phase process still contain chemically bound chlorine which is also said to have an adverse effect on the sintering properties and strength of the resulting moldings.

SUMMARY OF THE INVENTION

The problem addressed by the present invention was to provide materials and processes which, in one step, would both guarantee the crystallization of an amorphous nitrogen-containing silane compound to crystalline silicon nitride which an α-content of more than 90% and remove intragranular oxygen and chemically bound chloride from the powder.

This problem has been solved by a process in which an amorphous nitrogen-containing silane compound, for example silicon diimide, is mixed with a small quantity of a crystalline or amorphous compound containing at least the elements Si, P and N and the resulting mixture is subsequently heat-treated.

Accordingly, the present invention relates to a process for the production of low-needle silicon nitride of high α-content which is characterized in that an amorphous nitrogen-containing silane compound is mixed with a crystalline or amorphous compound consisting at least of the elements silicon, phosphorus and nitrogen and the resulting mixture is heat-treated at temperature above 1000° C.

DETAILED DESCRIPTION OF THE INVENTION

In a particularly preferred embodiment, the compound consisting at least of the elements silicon, phosphorus and nitrogen is in crystalline form.

In one preferred embodiment of this process, the silicon-, nitrogen- and phosphorus-containing compound has the composition $Si_{2-x}P_xN_{2+x}(NH)_{1-x}$ (x=0.1 to 1). Corresponding compounds are another subject of the invention.

The process can be carried out with particular advantage if the nitrogen-, phosphorus- and silicon-containing crystalline or amorphous compound is added in a quantity of at least 0.1% to 20% by weight and the heat treatment is carried out for at least 5 minutes at 1250° to 1700° C. The α-Si$_3$N$_4$ nuclei produced during the decomposition of the compound added in accordance with the invention then initiate transformation of the amorphous nitrogen-containing silane compound into needle-free, fine-particle α-silicon nitride. The second decomposition product, the phosphorus formed at these temperatures, reacts with the oxygen and chloride still present in the product to form gaseous phosphorus oxides and chlorides which are removed from the product via a gas stream, The effectiveness of the removal of oxygen and chlorine increases as the quantity of the nitrogen-, phosphorus- and silicon-containing compound in the mixture increases.

The heat treatment of the powder mixture should preferably be carried out in an atmosphere of nitrogen because the silicon nitride could partly decompose into silicon and nitrogen in argon or in vacuo, If the oxygen content of the silicon nitride powder thus treated should be too low (a total oxygen content of approx. 1 to 1.5% concentrated at the particle surface is necessary for good sintering properties), the crystalline powder may be aftertreated by known methods to achieve the necessary surface oxygen content, This selective enrichment ensures that the total oxygen content of the powder is located solely at the surface.

The present invention also relates to silicon-, phosphorus- and nitrogen-containing compounds particularly suitable for the process. The compounds in question are compounds having the composition $Si_{2-x}P_xN_{2+x}(NH)_{1-x}$ (x=0.1 −1) which consist of a three-dimensional network and in which both phosphorus and silicon are tetrahedrally surrounded by nitrogen or (N—H—) groups.

The products produced in accordance with the invention consist of Si, N and P as their main components and may also contain traces of C, Cl, H and O. The material is crystalline, but may also contain amorphous components. The crystalline component has a phase width lying between the compositions $Si_{1.9}P_{0.1}N_{2.2}(NH)_{0.9}$ and $SiPN_3$. The exact composition depends upon the particular calcination conditions.

Powder diffractographs of the material according to the invention were prepared with $CuK_{\alpha 1}$ radiation (WL=1.54056 Å) using a Stoa Stadi P powder diffractometer with a germanium monochromator and a location-sensitive proportional counter. The lattice plane intervals (d), which can be determined from the $2\theta$-positions of the X-ray lines, are expressed in Ångströms. $\theta$ corresponds to the Bragg angle of the X-ray diffraction maximum. The intensities are determined from the height of the diffraction maxima afar removal of the background. Like the d-values determined from them, the values of $2\theta$ are dependent on the exact composition of the mixed crystal, in addition to which they are always accompanied by a certain equipment-induced error which amounts to approx. 0.4 in the case of the $2\theta$ values. Nevertheless, it is generally possible clearly to characterize a crystalline substance on the basis of its X-ray reflexes by stating the d-values or $2\theta$ values and the intensities.

Typical values for the first eight X-ray reflexes of $Si_{2-x}P_xN_{2+x}(NH)_{1-x}$ (x=0.1-1) are shown in Table 1 below:

TABLE 1

| d[Å] | 2θ | Intensity |
|---|---|---|
| 4.56–4.51 | 19.46–19.63 | 280–320 |
| 4.51–4.49 | 19.63–19.75 | 850–1000 |
| 3.29–3.25 | 27.05–27.28 | 750–950 |
| 2.64–2.62 | 33.65–33.98 | 50–450 |
| 2.36–2.60 | 34.05–34.33 | 250–550 |
| 2.36–2.34 | 38.19–38.40 | 250–500 |
| 2.33–2.29 | 38.55–39.25 | 150–350 |
| 2.29–2.27 | 39.32–39.48 | 250–400 |

According to TGA measurements on powders of this compound, decomposition begins at around 750° to 900° C. At these temperatures, the (P—N) bonds are no longer stable so that the compound decomposes into an amorphous silicon- and nitrogen-containing phase and P or $N_2$. Decomposition is complete at around 1250° C., the crystallization of s-silicon nitrides is beginning at the same time. The relatively early beginning of crystallization is responsible for the predominant formation of $\alpha$-$Si_3N_4$ crystal nuclei. The weight loss of the compounds according to the invention up to the formation of silicon nitride is from about 8 to 54%, depending on their composition.

The compounds according to the invention may be produced by a solid-phase reaction between $P_3N_5$ and silicon diimide at 900° C., although the reaction times in this method are very long and the crystallinity of the product is very low.

Another possibility would be to react mixtures of $SiCl_4$ and $PCl_5$(P:Si-ratio at least 1:10) with ammonia and to heat-treat the product of this reaction.

Alternatively organo-metallic compounds consisting at least of phosphorus, silicon, nitrogen and halogen can be reacted with $NH_3$ and subsequently heat-treated.

Particularly good results are obtained in the following process which is another subject of the present invention. This process is characterized in that organoelemental compounds consisting at least of the elements silicon, phosphorus, nitrogen and halogen, the nitrogen being attached solely to silicon and phosphorus and the halogen being attached solely to silicon or phosphorus, are reacted with $NH_3$ and the reaction product is subsequently heat-treated.

However, the preferred starting compound is hexachlorosilyl phosphinimine $Cl_3Si-N=PCl_3$ (compound A) which was prepared for the first time by L. P. Filonenko and A. M. Pinchuk (J. Gen. USSR 49,348 (1979)).

A polymeric precursor of the compound according to the invention $Si_{2-x}P_xN_{2+x}(NH)_{1-x}$ (x=0.1 to 1) is formed by reaction of compound A with $NH_3$. This reaction may be carried out by any of the ammonolysis processes of $SiCl_4$ known from the literature, although the reaction with liquid ammonia at low temperatures of $-100°$ to $0°$ C. is preferred.

Another embodiment of the process according to the invention is characterized in that, instead of ammonia, the organoelemental compound is completely or partly reacted with aliphatic and aromatic amines containing at least one (N—H) group.

After removal of the ammonium chloride or amine hydrochloride formed by known methods, such as sublimation or washing with liquid ammonia, a polymeric imide still containing numerous NH, $NH_2$ and NHR groups is obtained. According to the invention, this polymeric imide is subsequently calcined in a stream of ammonia for at least one hour at temperatures of 400° to 1200° C. and preferably at temperatures of 500° to 950° C. This heat treatment may also be carried out in vacuo, in nitrogen and/or in argon.

The following Examples are intended to illustrate the invention without limiting it in any way. As proof of the effectiveness of the new crystallization auxiliary, comparison tests were carried out under the same experimental conditions as described in the Examples, but without the addition of a crystallization aid.

EXAMPLES 1-2 AND COMPARISON EXAMPLE 1

Amorphous silicon nitride powder is prepared from $SiCl_4$ and ammonia at high temperatures. After removal of the ammonium chloride formed by sublimation, 500 g of this powder are mixed with a certain quantity of the compound $Si_{2-x}P_xN_{2+x}(NH)_{1-x}$ (x=0.1 -1) and the resulting mixture is calcined for 4 hours at approx. 1450° C.

EXAMPLES 3-4 AND COMPARISON EXAMPLE 2

Amorphous silicon diimide powder is prepared from $SiCl_4$ and ammonia in an organic solvent at low temperatures. To remove the ammonium chloride formed, the product is washed with liquid ammonia. 500 g of the diimide are then mixed with a certain quantity of the compound $Si_{2-x}P_x(NH)_{1-x}$ (x=0.1-1) and the resulting mixture is calcined for 4 hours at approx. 1450° C.

The analytical data of the powder mixtures before calcination and the test parameters are shown in Table 2 below. The corresponding values after calcination are set out in Table 3.

TABLE 2

| Example | Quantity added [g] | X | Cl content [% by weight] | O content [% by weight] |
|---|---|---|---|---|
| 1 | 2.5 | 0.8 | 0.5 | 0.8 |

TABLE 2-continued

| Example | Quantity added [g] | X | Cl content [% by weight] | O content [% by weight] |
|---|---|---|---|---|
| 2 | 10 | 0.9 | 0.07 | 0.8 |
| C 1 | — | — | 0.3 | 0.6 |
| 3 | 2.5 | 0.8 | 0.05 | 1.9 |
| 4 | 10 | 0.9 | 0.03 | 1.6 |
| C 2 | — | — | 0.03 | 1.6 |

TABLE 3

| Example | Quantity added [g] | X | Cl content [% by weight] | O content [% by weight] | α content [% by weight] |
|---|---|---|---|---|---|
| 1 | 2.5 | 0.8 | 0.14 | 0.27 | 94 |
| 2 | 10 | 0.9 | 0.05 | 0.19 | 93 |
| C 1 | — | — | 0.2 | 0.5 | 85 |
| 3 | 2.5 | 0.8 | 0.01 | 1.0 | 95 |
| 4 | 10 | 0.9 | 0.008 | 0.4 | 96 |
| C 2 | — | — | 0.02 | 1.4 | 89 |

(C = Comparison Example)

EXAMPLE 5

Preparation of hexachloro-N-silyl phosphinimine (A)

1. 1,1,1-Trichloro-3,3,3-trimethyl disilazane (A1)

In accordance with J. P. Moser, H. Nöth and W. Tinhof in Z. Naturforsch. B 29, 166 (1974), 68.98 g (0.406 mol) silicon tetrachloride and 12.3 g (0.076 mol) hexamethyl disilazane are combined in a 250 ml three-necked flask and stirred for 14 hours at room temperature. Subsequent fractional distillation in a short Vigreux column gives 15 g (88%) of the colorless liquid.

2. 1,1,1,2-tetrachloro-3,3,3-trimethyl disilazane (A2)

In accordance with L. P. Filonenko and A. M. Pinchuk in J. Gen. Chem. USSR 49, 302 (1979), 13.8 g (0.063 mol) compound A1 and 5.1 ml (0.063 mol) pyridine are initially introduced into a reaction vessel in 180 ml carbon tetrachloride. 5 g (0.141 mol) chlorine are condensed at −40° C. and transferred to the reaction vessel. After stirring for 4 hours, the precipitate is filtered off and washed and the solvent is distilled off from the combined filtrates. Subsequent fractionation leads to 16.4 g of the yellowish liquid A2 in a yield of 75%.

Hexachloro-N-silyl phosphinimine (A)

In the same way as the above-described chlorination of the disilazane A1 to the N-chlorodisilazane A2, the reaction of A2 with phosphorus trichloride is also carried out in accordance with L. P. Filonenko and A. M. Pinchuk. To this end, a mixture of 13.4 g (0.052 mol) A2 and 15.5 ml (0.175 mol) phosphorus trichloride is refluxed for 4 hours and then fractionated through a short Vigreux column. 12.5 g of the N-silyl phosphinimine A are obtained in the form of a clear liquid, corresponding to a yield of 86%.

EXAMPLE 6

PREPARATION OF $Si_{2-x}P_xN_{2+x}(NH)_{1-x}$
(x=0.1-1) (I)

2.5 l ammonia are condensed under inert conditions into a 4 liter flask at −70° C. 472 g (1.66 mol) compound A are then slowly added dropwise with vigorous stirring at −70° C. A strongly exothermic reaction begins. After the addition, the reaction mixture is stirred for 30 minutes at −70° C.

The resulting mixture of compound I and ammonium chloride is transferred to a reversal frit and, to remove the ammonium chloride, is extracted for three days with liquid ammonia. 165.7 g of a pure white amorphous powder are left behind in the reversal frit.

10 g of this powder are transferred to a boron nitride boat and heated to 800° C. at a rate of 10° C./minute. The powder is then calcined for 10 h at that temperature in an atmosphere of ammonia. The yield of crystalline white I is 6.5 g.

Analytical data: Si: 29.2%, P: 26.7%, N: 39.1%, O: 0.9%, Cl: 0.14%, H: 0.2%.

X-ray data:

| d[Å] | 2Θ | Intensity |
|---|---|---|
| 4.53 | 19.56 | 312 |
| 4.50 | 19.71 | 1000 |
| 3.27 | 27.26 | 879 |
| 2.64 | 33.93 | 326 |
| 2.61 | 34.26 | 515 |
| 2.35 | 38.20 | 439 |
| 2.31 | 38.95 | 158 |
| 2.28 | 39.48 | 397 |

What is claimed is:

1. A process for the production of low-needle silicon nitride of at least 90% α-content, wherein an amorphous nitrogen-containing silane compound is mixed with a crystalline or amorphous compound comprising the elements silicon, phosphorus and nitrogen to form a mixture and said mixture is heat-treated at temperatures above 1000° C. to form said silicon nitride.

2. The process of claim 1, wherein the compound comprising the elements silicon, phosphorus and nitrogen has the composition $Si_{2-x}P_xN_{2+x}(NH)_{1-x}$ where x is from 0.1-1.

3. The process of claim 1, wherein the percentage content of the compound comprising the elements silicon, phosphorus and nitrogen in the mixture as a whole is from about 0.1 to 20% by weight.

4. The process of claim 2, wherein the percentage content of the compound comprising the elements silicon, phosphorus and nitrogen in the mixture as a whole is from about 0.1 to 20% by weight.

5. The process of claim 1, wherein the heat treatment is carried out for at least 5 minutes at a temperature of 1250° to 1700° C.

6. The process of claim 2, wherein the heat treatment is carried out for at least 5 minutes at a temperature of 1250° to 1700° C.

7. The process of claim 3, wherein the heat treatment is carried out for at least 5 minutes at a temperature of 1250° to 1700° C.

8. The process of claim 4, wherein the heat treatment is carried out for at least 5 minutes at a temperature of 1250° to 1700° C.

9. The process of claim 1, wherein the nitrogen-containing silane compound is selected from the group consisting of silicon diimide and silicon nitride.

10. The process of claim 2, wherein the nitrogen-containing silane compound is selected from the group consisting of silicon diimide and silicon nitride.

11. The process of claim 1, wherein the heat-treatment is carried out in an atmosphere consisting essentially of nitrogen.

12. The process of claim 2, wherein the heat-treatment is carried out in an atmosphere consisting essentially of nitrogen.

13. The process of claim 2, wherein said compound having the composition $Si_{2-x}P_xN_{2+x}(NH)_{1-x}$, where x is from 0.1-1, consists of a three-dimensional network in which both the phosphorus and the silicon are tetrahedrally surrounded by nitrogen or (N—H) groups.

14. The process of claim 13, wherein said compound having the composition $Si_{2-x}P_xN_{2+x}(NH)_{1-x}$, where x is from 0.1-1, are present in crystalline form and at least the following x-ray reflexes occur:

| d[Å] | 2Θ | Intensity |
|---|---|---|
| 4.56–4.51 | 19.46–19.63 | 280–320 |
| 4.51–4.49 | 19.63–19.75 | 850–1000 |
| 3.29–3.25 | 27.05–27.28 | 750–950 |
| 2.64–2.62 | 33.65–33.98 | 50–450 |
| 2.36–2.60 | 34.05–34.33 | 250–550 |
| 2.36–2.34 | 38.19–38.40 | 250–500 |
| 2.33–2.29 | 38.55–39.25 | 150–350 |
| 2.29–2.27 | 39.32–39.48 | 250–400 |

15. The process of claim 1, wherein the compound comprising the elements silicon, phosphorus and nitrogen is produced by one of the following processes:

a) a solid-phase reaction between $P_3N_5$ and silicon diimide at 900° C.;

b) a reaction of a mixture of $SiCl_4$ and $PCl_5$ with $NH_3$ to form a product followed by a heat treatment of the product;

c) a reaction of a mixture of $SiCl_4$ and an organometallic compound, said organometallic compound comprising phosphorus, silicon, nitrogen and halogen, with $NH_3$ to form a product followed by a heat treatment of the product; and d) a reaction between hexachlorosilyl phosphinimine ($Cl_3Si$—$N$=$PCl_3$) and $NH_3$ to form a product followed by a heat treatment of the product.

16. The process of claim 1, wherein the compound comprising the elements silicon, phosphorus and nitrogen is produced by a reaction of an organoelemental compound with either $NH_3$ or aliphatic and aromatic amines containing at least one (N—H) group to form a product followed by a heat treatment of the product, wherein said organoelemental compound comprises silicon, phosphorus, nitrogen and halogen and further wherein the nitrogen is attached solely to silicon and phosphorus and the halogen is attached solely to silicon or phosphorus.

17. The process of claim 16, wherein said heat treatment is carried out in vacuo or in at least one atmosphere comprising a gas selected from the group consisting of nitrogen, helium and argon.

* * * * *

UNITED STATES PATENT AND TRADEMARK OFFICE
CERTIFICATE OF CORRECTION

PATENT NO. : 5,340,561
DATED : August 23, 1994
INVENTOR(S) : Baldus et al.

It is certified that error appears in the above-indentified patent and that said Letters Patent is hereby corrected as shown below:

On the title page, item [54] and column 1, lines 2-4, the title should read as follows:

PROCESS FOR THE PRODUCTION OF $Si_3N_4$ USING A SILICON, PHOSPHOROUS AND NITROGEN CONTAINING PRECURSOR

Signed and Sealed this

Fifth Day of September, 1995

Attest:

BRUCE LEHMAN

*Attesting Officer*   *Commissioner of Patents and Trademarks*